US005756129A

United States Patent [19]
Yoshii et al.

[11] Patent Number: 5,756,129
[45] Date of Patent: May 26, 1998

[54] FILTER MEMBER AND SCREEN CHANGER FOR USE IN RESIN EXTRUDER

[75] Inventors: Yasuo Yoshii; Nobuki Nagami; Nobuhiro Yamasaki; Yoshiaki Nakata; Shinichi Fukumizu; Osamu Ikeda, all of Takasago, Japan

[73] Assignee: Kabushiki Kaisha Kobe Seiko Sho, Kobe, Japan

[21] Appl. No.: 600,930

[22] PCT Filed: Jun. 28, 1995

[86] PCT No.: PCT/JP95/01283

§ 371 Date: Feb. 29, 1996

§ 102(e) Date: Feb. 29, 1996

[87] PCT Pub. No.: WO96/01178

PCT Pub. Date: Jan. 18, 1996

[30] Foreign Application Priority Data

Jul. 1, 1994 [JP] Japan .................. 6-151243
Jul. 4, 1994 [JP] Japan .................. 6-152496

[51] Int. Cl.⁶ .................................................. B29C 47/68
[52] U.S. Cl. ............................. 425/185; 210/236; 210/447; 210/489; 210/498; 425/197; 425/199
[58] Field of Search ............................. 425/185, 197, 425/198, 199, 382.2, 382.4, 190; 210/489, 447, 498, 499, 236

[56] References Cited

U.S. PATENT DOCUMENTS

| | | |
|---|---|---|
| 2,661,497 | 12/1953 | Birmingham . |
| 3,584,355 | 6/1971 | Fischer ............................ 425/199 |
| 3,801,248 | 4/1974 | Fischer ............................ 425/199 |
| 3,811,659 | 5/1974 | Taylor et al. .................... 425/199 |
| 3,817,377 | 6/1974 | Piggott ............................ 425/199 |
| 3,863,001 | 1/1975 | Thumudo, Jr. . |
| 3,965,010 | 6/1976 | Phillips, Jr. et al. ........... 425/199 |
| 4,019,987 | 4/1977 | Krasnow .......................... 425/199 |
| 4,167,384 | 9/1979 | Shirato et al. ................... 425/199 |
| 4,416,605 | 11/1983 | Konno et al. .................... 425/197 |
| 4,755,290 | 7/1988 | Neuman et al. .................. 425/199 |
| 5,439,589 | 8/1995 | Whitman .......................... 425/197 |

FOREIGN PATENT DOCUMENTS

| | | | |
|---|---|---|---|
| 66931 | 10/1957 | France .................... | 425/199 |
| 47 39160 | 12/1972 | Japan . | |
| 55-132230 | 10/1980 | Japan . | |
| 64-48221 | 3/1989 | Japan . | |
| 374147 | 6/1932 | United Kingdom .... | 425/199 |
| 2 073 038 | 10/1981 | United Kingdom . | |
| 2 096 912 | 10/1982 | United Kingdom . | |

OTHER PUBLICATIONS

Kunststoffberater, vol. 37, No. 5, pp. 42–45, May 1, 1992, H. Koching, "Folien/Fasern—Verdichten Scmelze—Filtrierung".

Primary Examiner—James P. Mackey
Attorney, Agent, or Firm—Oblon, Spivak, McClelland, Maier & Neustadt, P.C.

[57] ABSTRACT

A filter member includes a breaker plate having an increased filtering area without any deterioration in screen back-up capability. This filter member is adapted to filter off impurities of resin melt and is disposed in a resin passage. The filter member includes a screen and a breaker plate for backing up the screen. The breaker plate has resin passageways in the form of elongated slits extending as intersecting the flow direction of resin material.

6 Claims, 19 Drawing Sheets

FILTER MEMBER AND SCREEN CHANGER FOR USE IN RESIN EXTRUDER

BACKGROUND OF THE INVENTION

1. Field of the Invention

The present invention relates to filter members for use in resin extruders (inclusive of kneaders and molding machines) and to screen changers for use in such resin extruders.

2. Discussion of the Background

A filter member for filtering off impurities contained in a resin material is incorporated in the resin passage of resin extruders (inclusive of kneaders and molding machines) adapted to extrude resin materials such as polyolefins and compounds.

A flat-type filter member is known comprising a screen for filtering off impurities and a breaker plate attached to the rear side of the screen for backing up the screen, as disclosed in Japanese Examined Patent Publication No. SHO 59-27698.

Conventional breaker plates have a multiplicity of circular resin passageways, and the ratio of opening thereof is set to about 50% to maintain a strength sufficient to back-up the screen.

For this reason, the filter member has a decreased effective filtering area within a limited area and hence tends to have a larger diameter.

It is a general practice to provide a screen between the resin melt outlet of an extruder or the like and the inlet of a mold (hereby meant to include a granulating die) to filter off impurities contained in resin melt, and to provide a device for changing the used screen soiled by much accumulation of the impurities and the like on the mesh of the screen for a new screen without the need of stopping the operation of the extruder or the like.

Conventionally known ones of this type of screen changer are described in Japanese Unexamined Patent Publication No. SHO 47-39160 and Japanese Examined Patent Publication No. SHO 59-27698. FIG. 21 shows a screen changer 60 as described in Japanese Unexamined Patent Publication No. SHO 47-39160 which includes a slide bar 65 slidably interposed between resin melt outlet 62 of an extruder 61 and inlet 64 of a molding die 63, breaker plates 67A and 67B respectively provided in a pair of resin passageways 66A and 66B extending as intersecting the moving direction of the slide bar 65, and screens 68A and 68B inserted through the breaker plates, each of the screens comprising seven bottomed cylindrical screens.

In changing the screen 68A or 68B for a new one by the screen changer 60, the slide bar 65 is made to slide so as to expose the screen 68A from between the resin melt outlet 62 of the extruder 61 and the inlet 64 of the molding die 63 and to move the other screen 68B to a position between the resin melt outlet 62 of the extruder 61 and the inlet 64 of the molding die 63, and in this condition the screen 68A is changed for a new one.

FIG. 22 shows a screen changer 70 as described in Japanese Examined Patent Publication No. SHO 59-27698 which includes a body 72 having two branched resin passages 71A and 71B and through-holes 72A and 72B extending as orthogonally crossing the resin passages 71A and 71B, respectively, slide bars 73A and 73B slidably installed in the through-holes 72A and 72B, respectively, breaker plates 75A and 75B fitted in resin passage holes 74A and 74B defined in the bars 73A and 73B, respectively, and screens 76A and 76B.

In changing the screens 76A and 76B for new ones by the screen changer 70, the slide bar 73A is made to slide so as to close the resin passage 71A and expose the screen 76A. After changing the screen 76A for a new one while allowing resin to pass through the other screen 76B, the slide bar 73A is made to slide back so as to open the resin passage 71A. Subsequently the other slide bar 73B is made to slide for the screen 76B to be changed for a new one.

With the former conventional changer 60, though the resin filtering area can be increased by increasing the number of bottomed cylindrical screens 68A and 68B, the flow of the resin melt is interrupted during the changing operation and, in addition, the screens has to be changed together with the breaker plate 67A or 67B because the number of the screens is large. Furthermore, the breaker plates 67A and 67B, if in a large plant, are heavy and hot, resulting in troublesome changing operations and in difficulty in cleaning.

On the other hand, the latter conventional changer 70 has advantages that the flow of resin is never interrupted in changing the screens 76A and 76B because the resin passage is branched into two and that the changer facilitates the changing operations. Typically, the slide bars 73A and 73B are shaped like logs, and the breaker plates 75A and 75B are shaped circular for the ease of fabrication. With such circular breaker plates, if the filtering area is desired to be enlarged, the slide bars must be also enlarged in diameter, resulting in the body enlarged, hence, in the overall device enlarged. This raises critical problems in terms of space and cost.

SUMMARY OF THE INVENTION

It is, therefore, a first object of the present invention to provide a filter member having an increased effective filtering area in a limited area and hence allowing for minimization of the size thereof by forming slit-like resin passageways in a breaker plate so as to ensure an increased ratio of opening (70% to 80%) without any deterioration in the back-up capability.

It is a second object of the present invention to provide a screen changer for use in resin molding machines which permits easy screen changing operations without interrupting the flow of resin melt, facilitates cleaning operations, and provides an increased resin filtering area.

To attain the above first object, the present invention provides the following technical means in a filter member comprising in combination a screen for filtering off impurities contained in a resin material flowing in an extruder and a breaker plate having a multiplicity of resin passageways and attached to the rear side of the screen for backing up the screen.

Specifically, the present invention is characterized in that the resin passageways of the breaker plate are configured into elongated slits extending in a direction intersecting the flow direction of resin.

It is desired that the breaker plate comprise a first plate on the upstream side thereof and a second plate on the downstream side thereof which are mated to each other, the slits of one of the first and second plates being larger in width than those of the other plate and extending as intersecting those of the other plate.

Alternatively, it is desired that the breaker plate comprise a first plate on the upstream side thereof and a second plate on the downstream side thereof which are mated to each other, the resin passageways of the first plate being configured into elongated slits, and those of the second plate being configured into circular holes.

Further, the face of the breaker plate defining the resin passageways may be configured circular or rectangular, and it is desired that the screen and the breaker plate respectively comprise curved surfaces having a single curvature which protrude in the extrusion direction or the direction opposite thereto.

With the filter member according to the present invention, a resin material extruded from an extruder is filtered for its impurities by the screen of the filter member in the course of its flowing in the direction indicated by the arrow in FIG. 1(A).

Since the resin passageways of the breaker plate in the filter member are configured into elongated slits extending as intersecting the direction of the arrow, the back-up capability of the breaker plate can be sufficiently ensured even when the ratio of opening of the slits is increased relative to that of circular holes.

To attain the foregoing second object, the present invention provides the following technical means.

Specifically, the present invention provides a screen changer for use in a resin molding machine which is adapted to change a screen disposed at a resin melt outlet of an extruder or the like to filter off impurities contained in a resin melt, the screen changer comprising: an changer body in which a resin passage is divided into divided passages juxtaposed to each other in the middle of a course of the resin passage from a resin melt inlet to a resin melt outlet and in which a screen holding bar receiving bore is provided extending through the changer body as generally orthogonally intersecting each of the divided passages; a screen holding bar slidably fitted through the bore; and a screen including a bottomed cylindrical strainer and a screen mesh and mounted in one or two resin melt passage holes defined in the bar, the resin melt passage holes being capable of communicating with each of the divided passages and extending as orthogonally intersecting the axis of the bar.

In the present invention, it is desired that the screen mesh of the screen be removably attached to the strainer.

The present invention further provides a screen changer comprising: an changer body in which a resin passage is divided into divided passages juxtaposed to each other in the middle of a course of the resin passage from a resin melt inlet to a resin melt outlet and in which a screen holding bar receiving bore is provided extending through the changer body as generally orthogonally intersecting each of the divided passages; a screen holding bar slidably fitted through the bore; a screen changeably mounted in one or two resin melt passage holes defined in the bar, the resin melt passage holes being capable of communicating with each of the divided passages and extending as orthogonally intersecting the axis of the bar; and a breaker plate having a multiplicity of through-holes and attached to the resin flow-out side of the screen, wherein each of the resin melt passage holes are configured square in section at least on the resin flow-in side thereof, and the screen and the breaker plate, which are configured square, are disposed on the resin flow-in side of each of the resin melt passage holes.

It is desired that the breaker plate or each of the resin melt passage holes of the screen holding bar be provided therein with a sealing wall.

With the screen changer according to the present invention, resin melt introduced in the changer from the outlet of an extruder or the like passes through each of the divided passages, is filtered with the respective screen mesh, joins together, and is guided to a mold or the like. In changing the screens, one of the screen holding bars is slid to expose the corresponding screen while, at the same time, one of the divided passages is closed by the screen holding bar. Then, only the soiled screen mesh of the exposed screen is changed for a new one while the resin melt is allowed to pass through the other screen. The screen holding bar then is slid in the opposite direction to return the new screen into the divided passage.

In turn, the other screen holding bar is slid to expose the screen thereof and to close the other divided passage. The soiled screen mesh of the thus exposed screen is changed for a new one while the resin melt is allowed to pass through the other screen previously changed. Subsequently the screen holding bar of interest is slid in the opposite direction to return the screen thereof into the divided passage to permit resin melt to pass therethrough.

As obvious from FIG. 15, by configuring the breaker plate into square it is possible to ensure a larger filtering area than conventional without varying the diameter of the screen holding bar. This allows for large-capacity filtration thereby enabling the production to increase.

Further, the provision of a sealing wall in the breaker plate or in each of the resin passage holes along with the breaker plate in square configuration prevents resin melt from flowing out of the screen changer and makes it possible to shorten a sealing portion between the changer body and the screen holding bars, thereby reducing the size of the changer body, assuring the screen changer worked with improved precision, and reducing the working cost.

BRIEF DESCRIPTION OF THE DRAWINGS

FIG. 1 illustrates a first embodiment of a filter member according to the present invention, in which

FIG. 2 illustrates a second embodiment of a filter member according to the present invention, in which

FIG. 3 illustrates a third embodiment of a filter member according to the present invention, in which

FIG. 4 illustrates a fourth embodiment of a filter member according to the present invention, in which

FIG. 5 illustrates a fifth embodiment of a filter member according to the present invention, in which

DESCRIPTION OF THE PREFERRED EMBODIMENTS

Figure 1A:
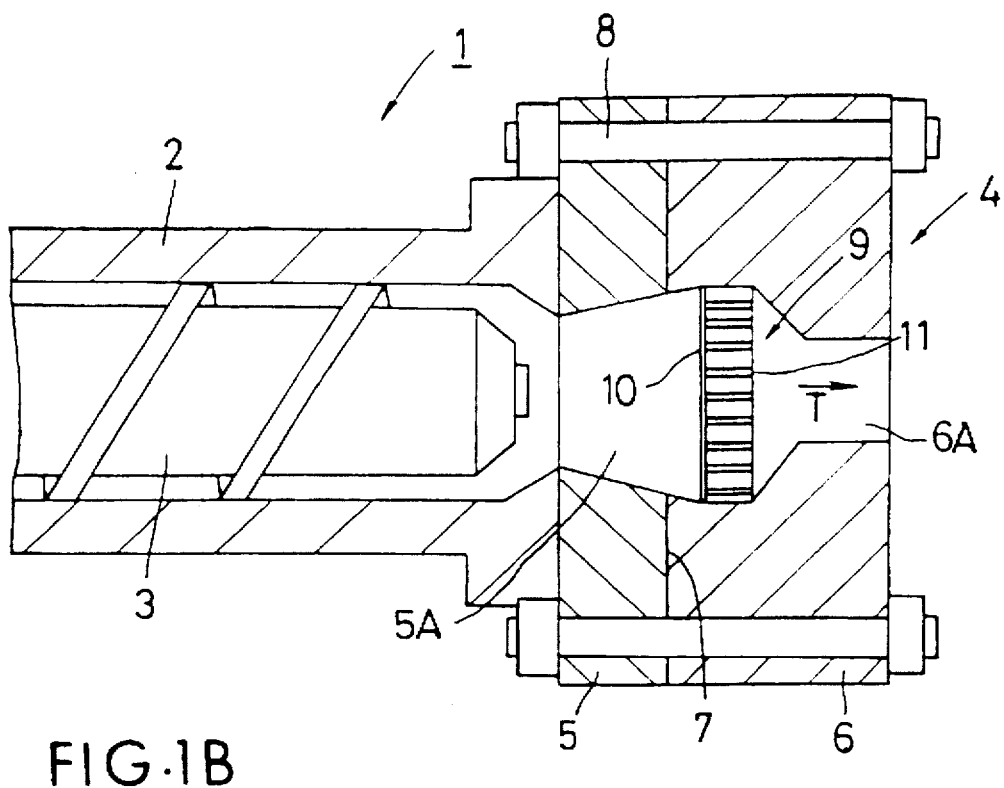
FIG. 1(A) is a sectional view of an extruder.

In FIG. 1(A) showing the first embodiment of a filter member according to the present invention, an extruder 1 (hereby meant to include a kneader and a molding machine) for extruding a resin material such as a polyolefin or a compound comprises an elongated cylindrical barrel 2 and a screw 3 inserted into the barrel 2 which, by its rotation, causes the resin material to flow in the direction indicated by an arrow T and extrudes it into a molding die (not shown) or the like.

Between the extruder 1 and the molding die is interposed a filter device 4 including a first body 5 defining a passage 5A, a second body 6 defining a passage 6A which are mated together at their mating surfaces 7 and fastened with a plurality of bolts 8, and a filter member 9 disposed in the passage 6A of the second body 6.

The filter member 9 comprises, in combination, a screen 10 made of a mesh material for filtering off the impurities of the resin material, and a breaker plate 11 attached to the rear side of the screen 10 for backing up the same.

The screen 10 includes a plurality of mesh material layers superposed one on another.

Figure 1B:
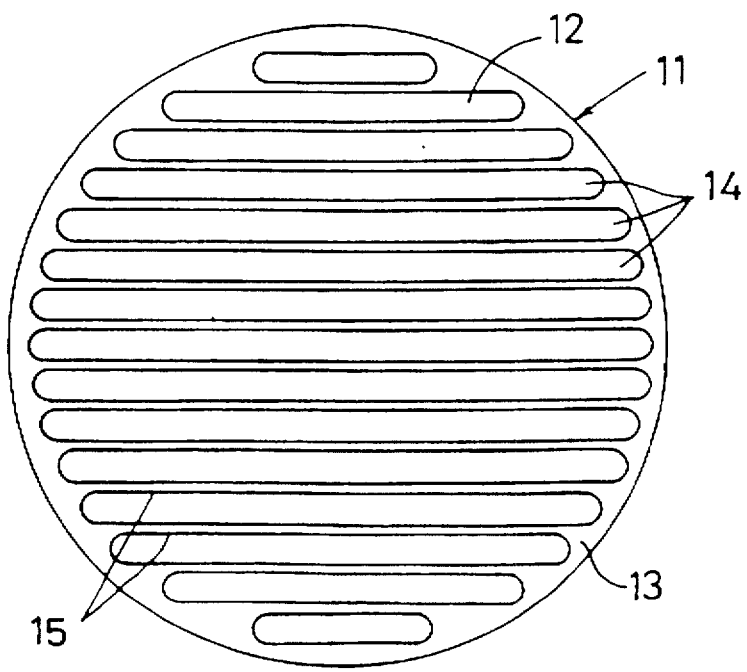
FIG. 1(B) is a front elevation of a breaker plate.

As shown in FIG. 1(B), the breaker plate 11 according to the first embodiment has a multiplicity of resin passageways 12 in a passageway defining face 13 shaped circular. The passageways are in the form of elongated slits 14 extending as intersecting the resin flow direction T. Rib portions 15 separating the slits 14 from each other ensure sufficient back-up capability even when they are formed very thin and this allows the resin passageways to have a ratio of opening of 70 to 80% relative to the passageway defining face 13.

Figure 2B:
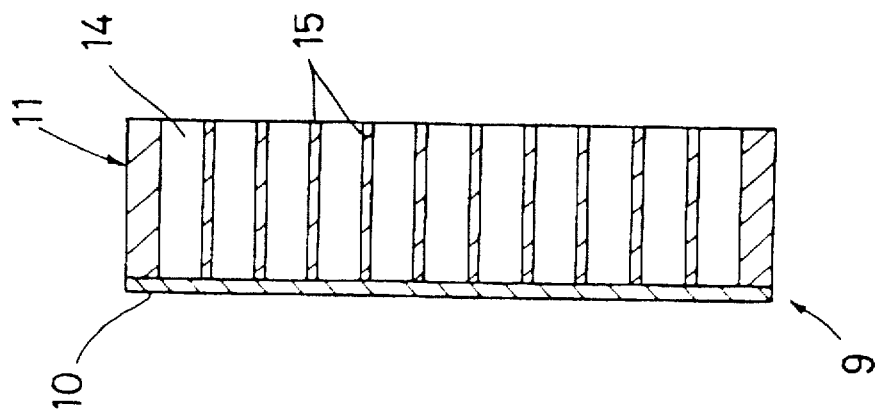
FIG. 2(B) is a sectional view thereof.
Figure 2A:
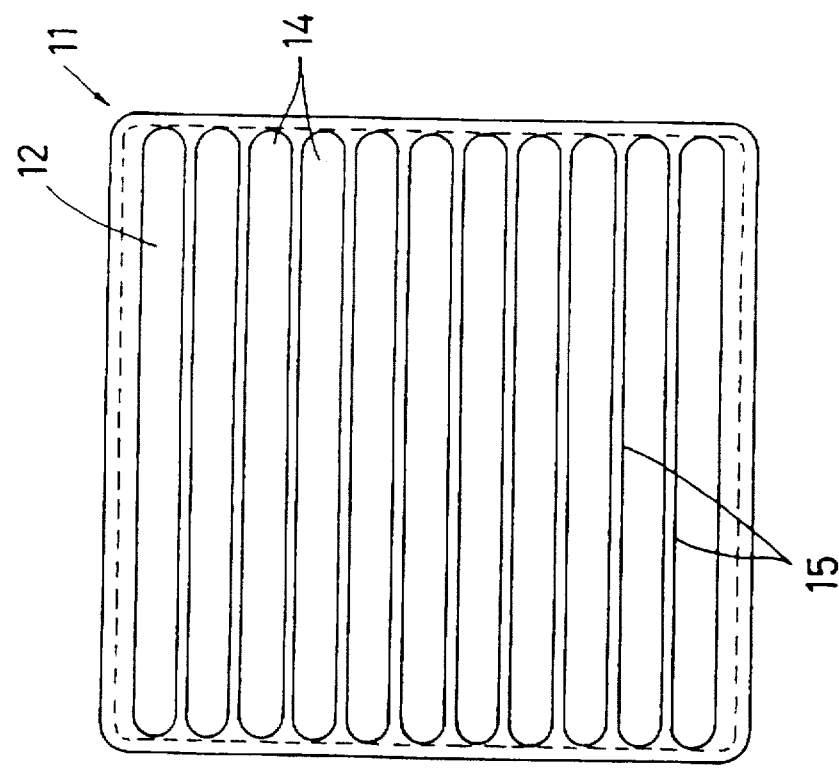
FIG. 2(A) is a front elevation thereof.

FIGS. 2(A) and 2(B) show the second embodiment of a filter member according to the present invention. In contrast to the screen 10 and breaker plate 11 of the first embodiment being shaped circular, those of the second embodiment are shaped rectangular. By shaping them rectangular it is possible to increase the effective filtering area as compared with the circular configuration.

It should be noted that like reference characters designate corresponding parts throughout the first and second embodiments.

Figure 3C:
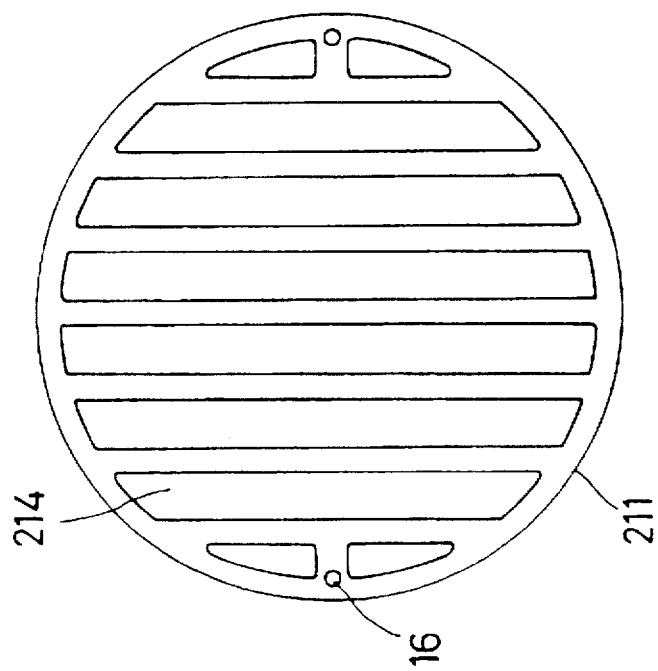
FIG. 3(C) is a front elevation of a second plate.
Figure 3B:
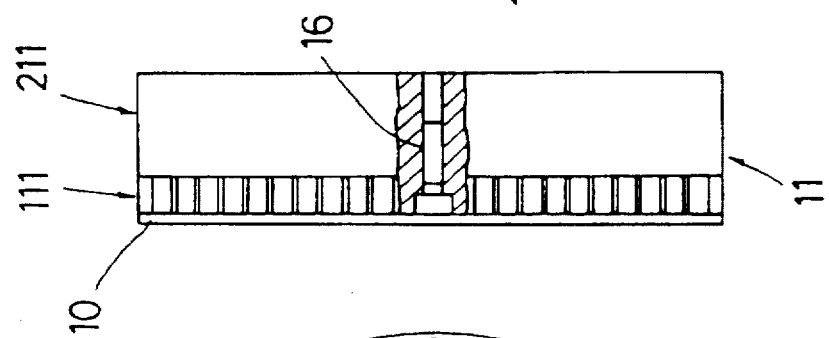
FIG. 3(B) is a sectional view of the filter member.
Figure 3A:
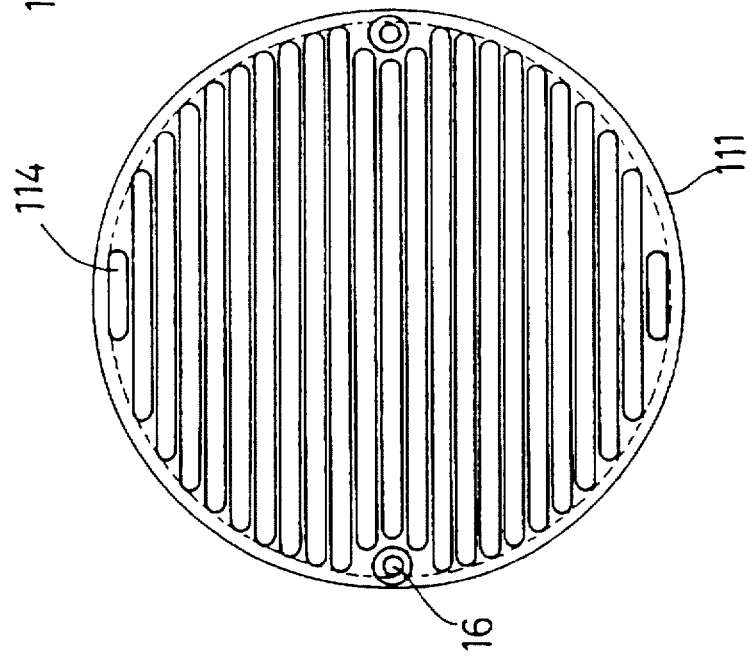
FIG. 3(A) is a front elevation of a first plate.

FIGS. 3(A), 3(B) and 3(C) show the third embodiment of a filter member according to the present invention in which breaker plate 11 attached to the rear side of screen 10 includes a first plate 111 and a second plate 211 which are mated together and assembled by means of a bolt 16. Slits 214 of the second plate 211 are made wider than slits 114 of the first plate 111, the slits 114 and 214 extending as intersecting each other. However, the width relation between the slits 114 and 214 may be converse to that shown in the drawings; i.e., the slits 114 may be made wider than the slits 214.

Figure 4C:
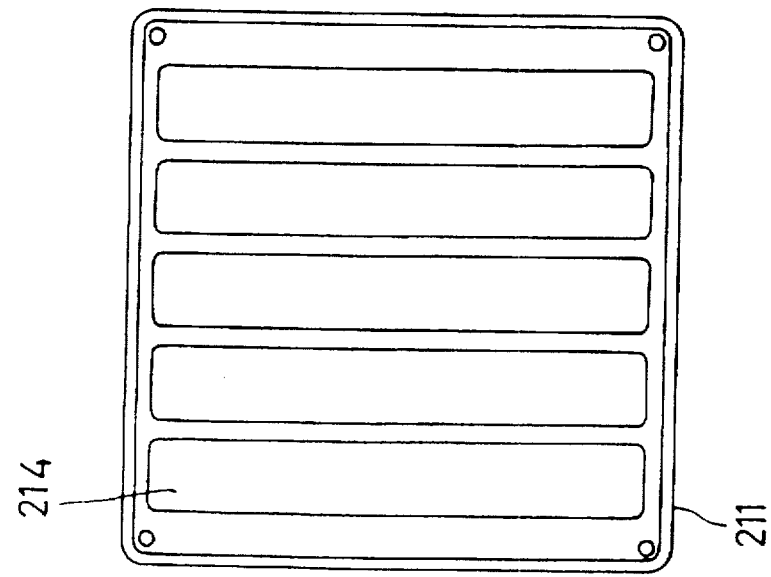
FIG. 4(C) is a front elevation of a second plate.
Figure 4B:
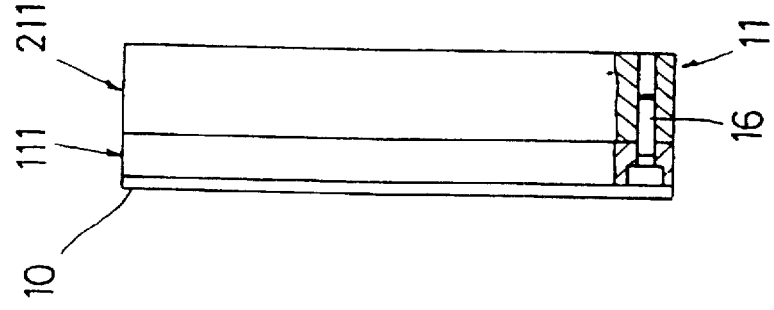
FIG. 4(B) is a sectional view of the filter member.
Figure 4A:
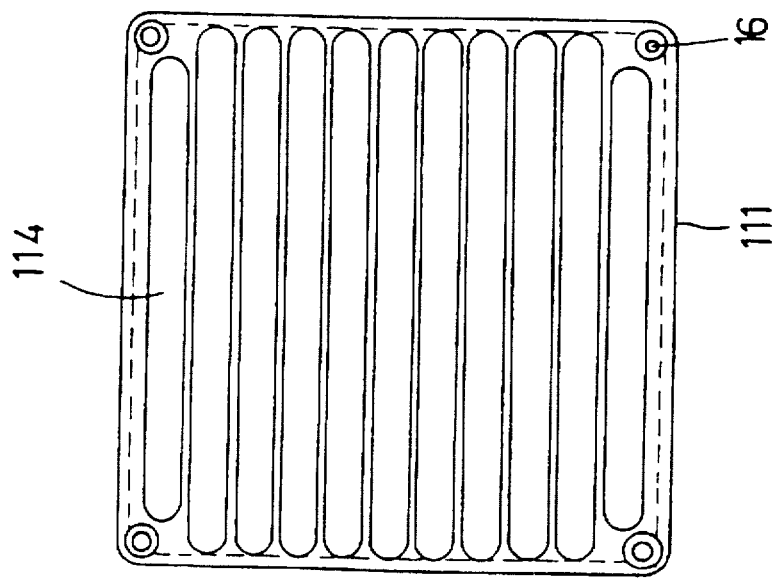
FIG. 4(A) is a front elevation of a first plate.

FIGS. 4(A), 4(B) and 4(C) show the fourth embodiment of a filter member according to the present invention which is basically the same as the third embodiment in arrangement. However, the fourth embodiment differs from the third embodiment in that, in contrast to the screen 10 and breaker plate 11 shaped circular in the third embodiment, those in the fourth embodiment are shaped rectangular to ensure a larger effective filtering area. It should be noted that like reference characters designate corresponding parts throughout the third and fourth embodiments.

The third and fourth embodiments ensure a low pressure loss property by making the slits 214 of the second plate 211 wider than the slits 114 of the first plate 111.

Figure 5C:
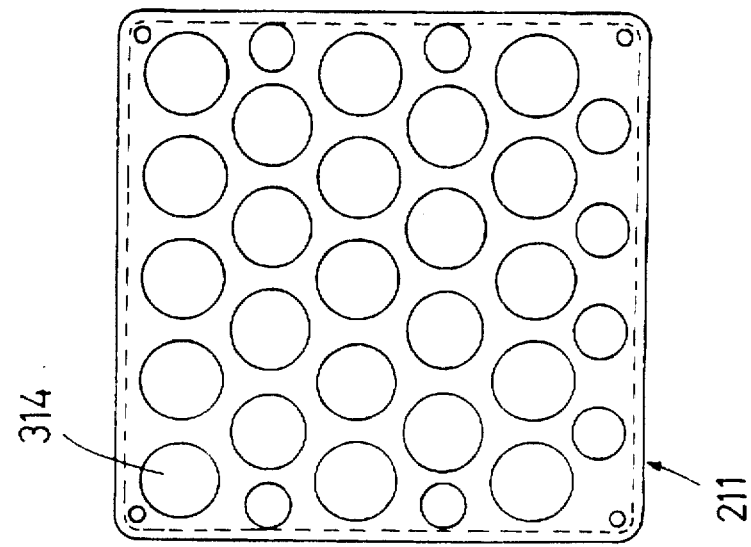
FIG. 5(C) is a front elevation of a second plate.
Figure 5B:
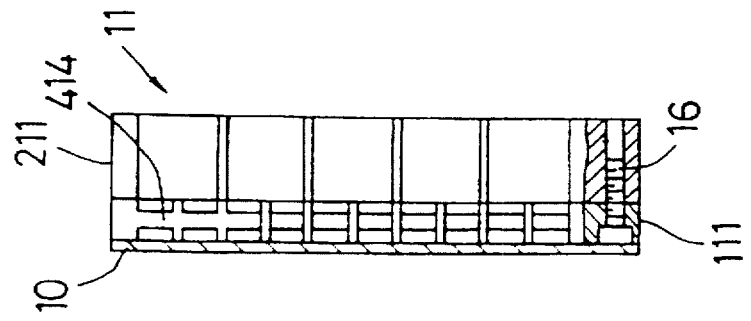
FIG. 5(B) is a sectional view of the filter member.
Figure 5A:
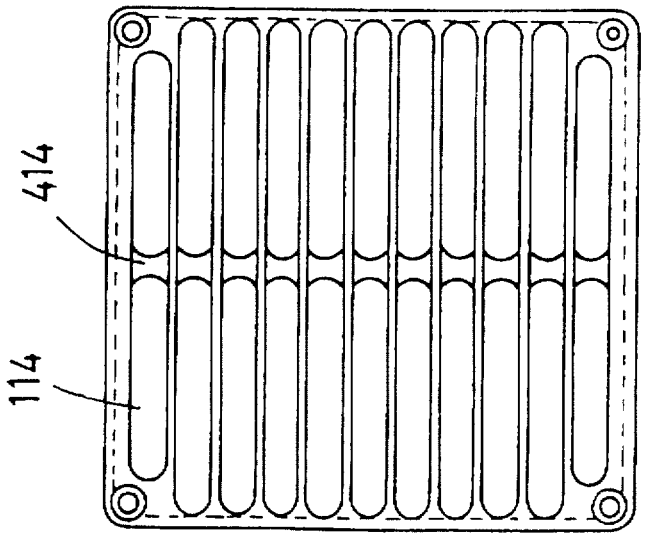
FIG. 5(A) is a front elevation of a first plate.

FIGS. 5(A), 5(B) and 5(C) show the fifth embodiment of a filter member according to the present invention in which breaker plate 11 attached to the rear side of screen 10 includes first plate 111 and second plate 211 which are mated together and assembled by means of bolt 16. The first plate 111 defines slits 114, while on the other hand the second plate 211 defines circular holes 314, whereby the breaker plate 11 enjoys a low pressure loss property. Further, the slits 114 of the first plate 111 centrally have a partition wall 414 which is recessed on both the front side and rear side thereof to increase the net filtering area of the screen 10 and to ensure an sufficient passage area between the first plate 111 and the second plate 211.

Although the screen 10 and the breaker plate 11 shown in FIGS. 5(A), 5(B) and 5(C) are shaped rectangular, these may be shaped circular. Also, the partition wall 414 may be recessed on either one of the front and rear sides thereof.

Figure 6:
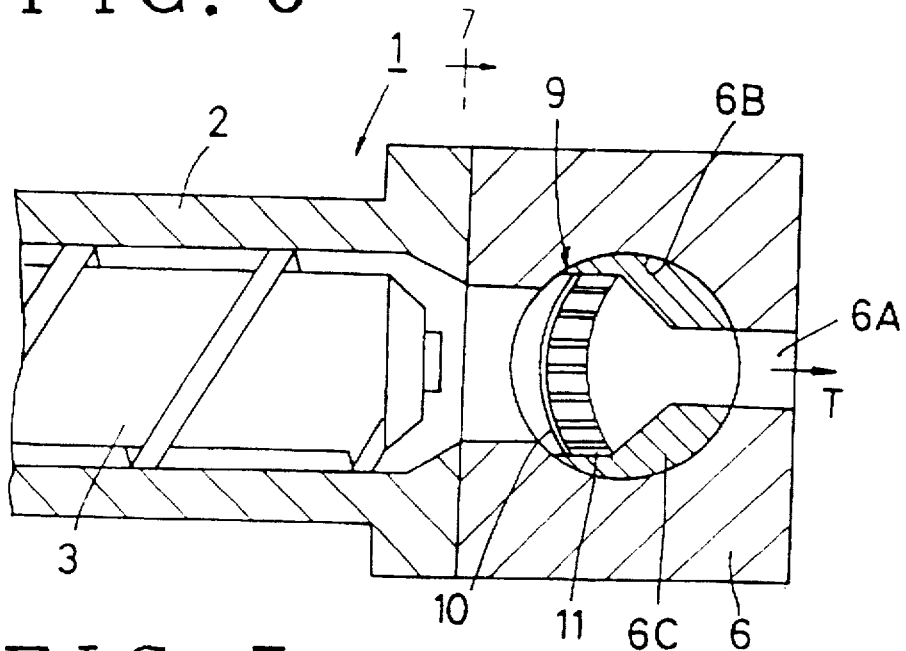
FIG. 6 is a sectional view of an extruder incorporating a filter member having a convex surface according to an embodiment of the present invention.
Figure 7:
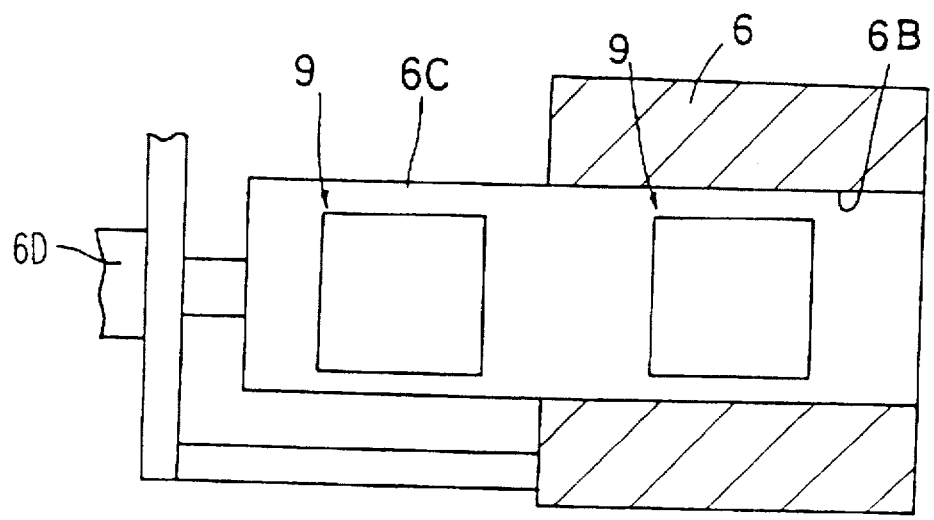
FIG. 7 is a sectional view taken along line A—A of FIG. 6.

FIGS. 6 and 7 show an embodiment with a screen change function wherein second body 6 defines a circular bore 6B extending as intersecting the extrusion direction into which is fitted a slide member 6C provided with a pair of juxtaposed filter members 9 according to any one of the foregoing embodiments so that the pair of filter members 9 are alternately usable by means of cylinder 6D.

Although it is possible to employ any one of the first to fifth embodiments as the filter members 9 of the embodiment shown in FIGS. 6 and 7, the provision of screen 10 and breaker plate 11 respectively having convex curved surfaces of a single curvature makes it possible to provide a further increased filtering area as compared with the flat-type ones.

Figure 8:
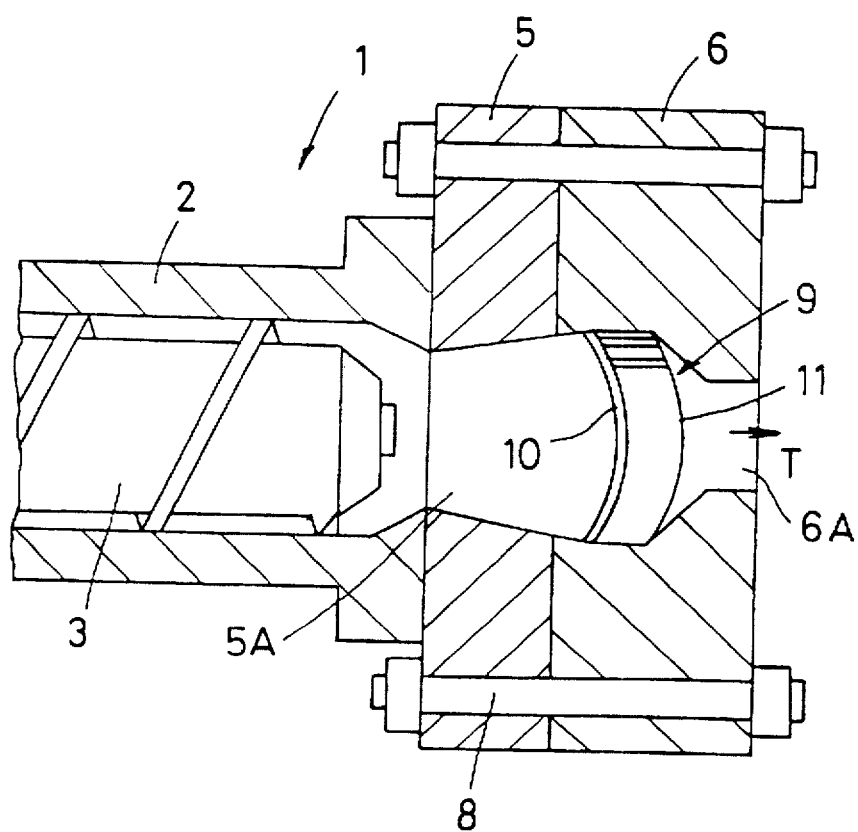
FIG. 8 is a sectional view of an extruder incorporating a filter member having a concave surface according to an embodiment of the present invention.
Figure 9:
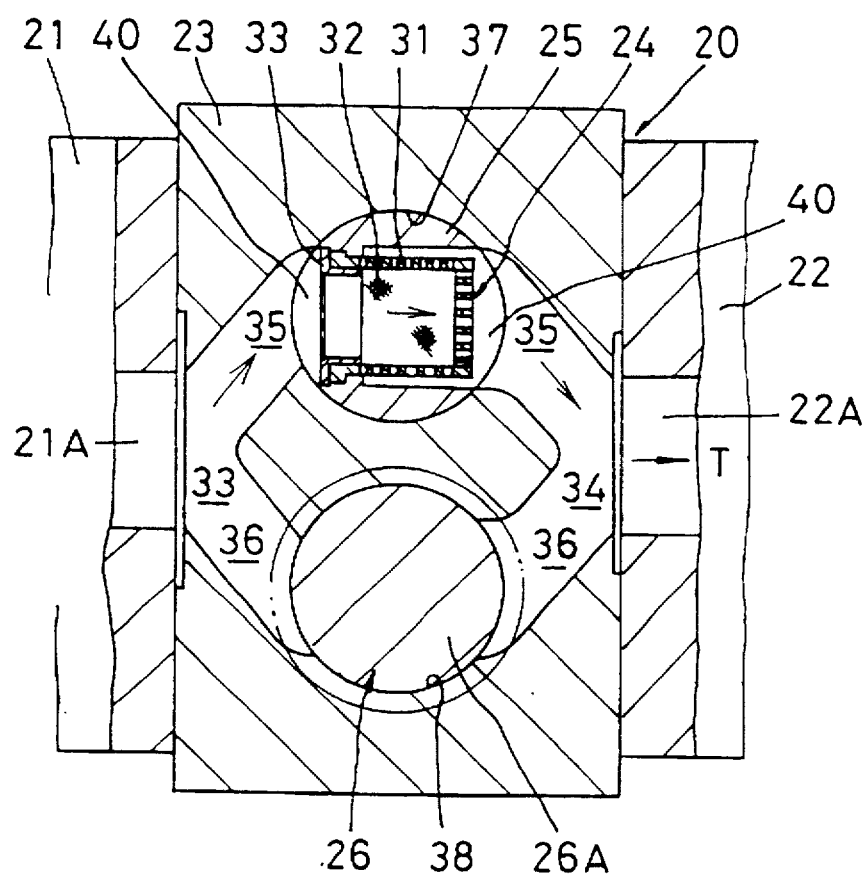
FIG. 9 is an enlarged sectional view, taken along line A—A of FIG. 10, showing a first embodiment of a screen changer according to the present invention.
Figure 10:
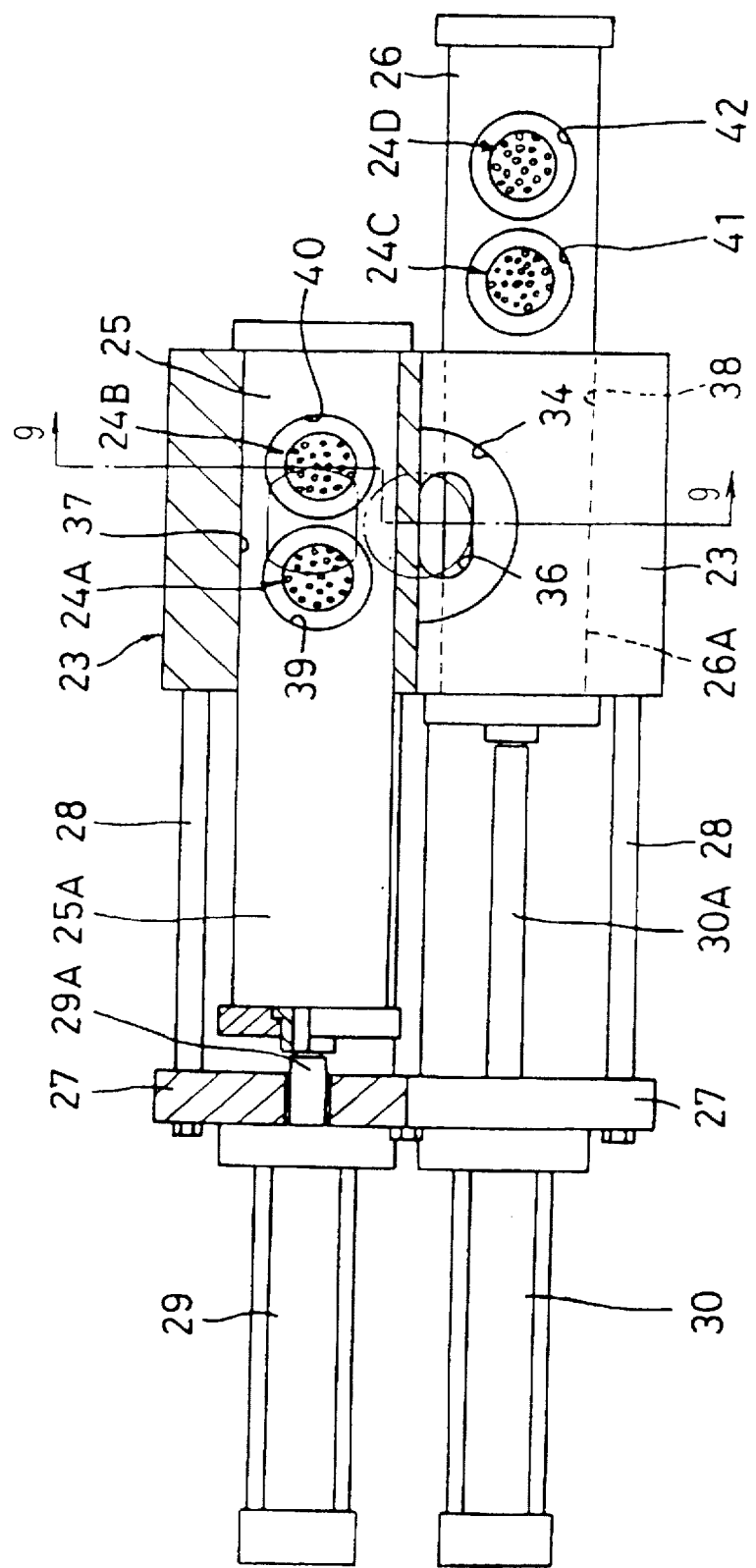
FIG. 10 is a partially cut-away front elevational view of the embodiment.
Figure 11:
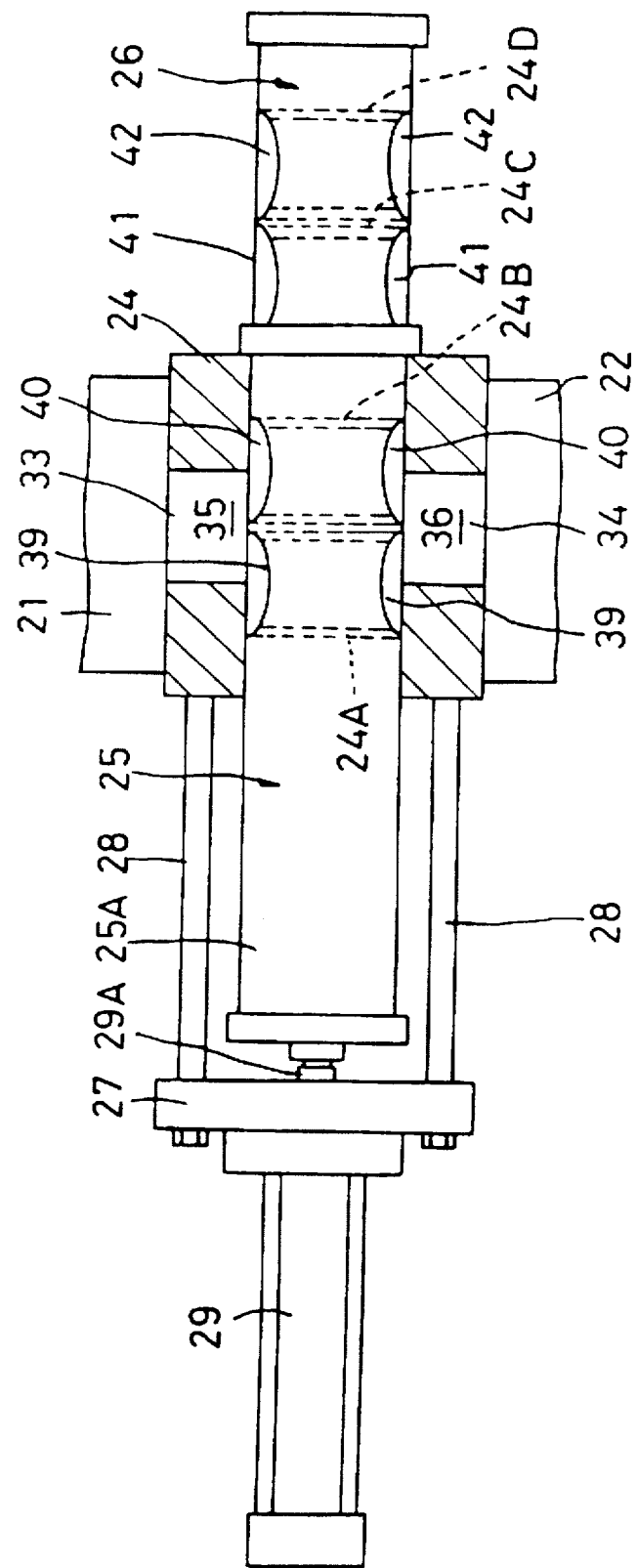
FIG. 11 is a partially cut-away plan view of FIG. 10.

In this case, the convex curved surfaces may be protruded in either the opposite direction of the extrusion direction as shown in FIGS. 6 and 7 or the extrusion direction as shown in FIG. 8.

As has been described in detail, with the filter member according to the present invention it is possible to increase the ratio of opening of resin passageways in the breaker plate without any deterioration in the screen back-up capability and hence increase the effective filtering area within a limited area.

Next, description will be made to embodiments of a screen changer according to the present invention with reference to the drawings.

FIGS. 9 to 13 show a first embodiment of a screen changer according to the present invention and wherein screen changer 20 is disposed intermediate between a resin melt outlet 21A of a plastic molding machine, or specifically an extruder 21 and a resin melt inlet 22A of a mold 22.

Figure 12:
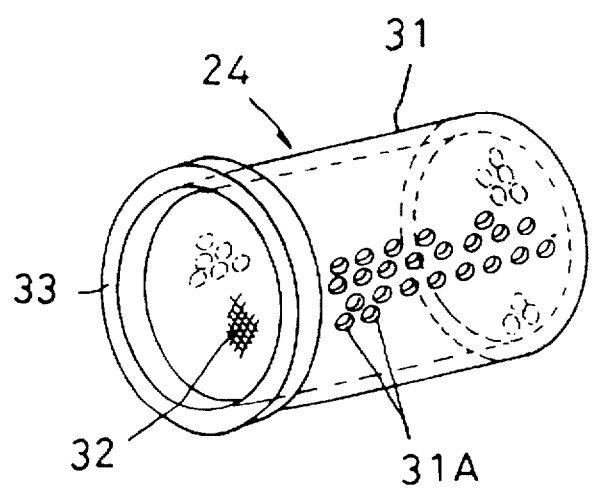
FIG. 12 is an enlarged perspective view showing a screen of the embodiment.

The screen changer 20 includes a changer body 23 shaped rectangular parallelepiped, screens 24, screen holding bars 25 and 26, cylinder mounting members 27 and supporting rods 28 which are secured to the changer body 23, and cylinders 29 and 30 as means for slidably driving the bars 25 and 26. As shown in FIG. 12, the screens 24 each comprise a bottomed cylindrical strainer 31 made of a plate having a multiplicity of perforations 314, a bottomed cylindrical screen mesh 32 fitted in the strainer 31, and a mesh set ring 33. This arrangement requires a change of only the screen mesh 32 for a new one.

In the changer body 23 the resin passage is divided into two juxtaposed passages 35 and 36 in the middle of the resin passage from resin melt inlet 33 to resin melt outlet 34; screen holding bar receiving bores 37 and 38 extend through the divided passages 35 and 36, respectively, in a direction intersecting the divided passages 35 and 36; and the aforementioned screen holding bars 25 and 26 are slidably inserted through the corresponding receiving bores 37 and 38.

The screen holding bars 25 and 26 are each in the form of a log and about twice as long as the length of each of the screen holding bar receiving bores 37 and 38. In respective forward end portions of the screen holding bars 25 and 26 are defined pairs of resin melt passage holes 39 and 40, and 41 and 42, each pair of resin melt passage holes being located adjacent to each other and extending as intersecting the axis of each of the bars 25 and 26. Screens 24A, 24B, 24C and 24D are removably fitted in the passage holes 39 to 42, respectively, which holes are capable of communicating with the corresponding divided passages 35 and 36.

To the respective base ends of the bars 25 and 26 are separably connected the respective outward ends of piston rods 29A and 30A of the cylinders 29 and 30. When the piston rods 29A and 30A are in their retracted condition, the divided passages 35 and 36 communicate with the corresponding passage holes 39 to 42. When the piston rods 29A and 30A are in their extended condition, the divided passages 35 and 36 are closed by respective base portions 25A and 26A of the screen holding bars 25 and 26 to block the flow of resin melt, while at the same time each screen 24 is exposed from the changer body 23 and hence is ready to be changed.

By referring to FIG. 13 the procedure of changing the screens 24 in the above embodiment is to be described.

Figure 13A:
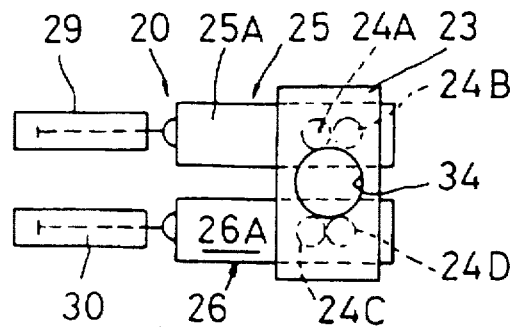
FIG. 13 is an explanatory view for illustrating a screen changing procedure in respect of a screen changer according to the present invention.
Figure 13B:
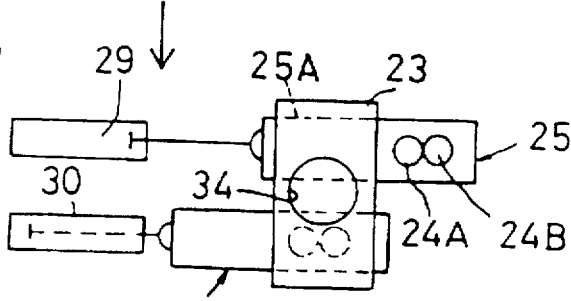
Figure 13C:
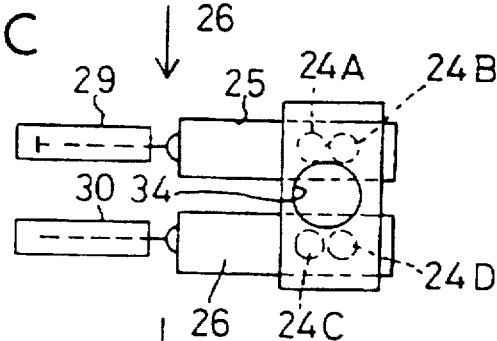
Figure 13D:
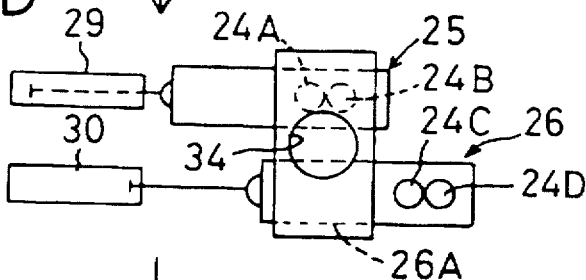
Figure 13E:
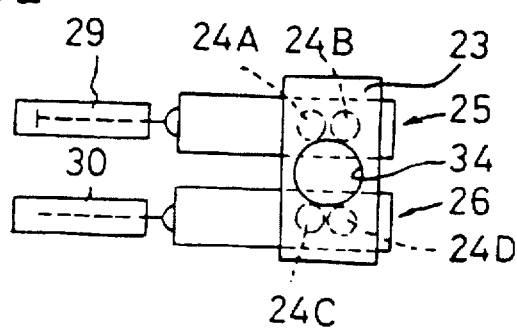

In the condition shown in FIG. 13(I) resin melt supplied from the extruder 21 flows through all the screens 24A to 24D. As indicated by arrows of FIG. 9, the resin melt entering the inlet 33 of the changer body 23 passes through the divided passages 35 and 36, reaches the inner sides of the screens 24A to 24D, passes through the screen meshes 32 from the inner sides thereof toward the outer sides thereof, passes the holes 31A of the strainers 31, passes in the divided passages 35 and 36, reaches the outlet 34, and flows toward the resin inlet 22A of the mold 22.

When the screens 24A to 24D becomes soiled with accumulation of impurities or the like thereon, the screens 24A and 24B are to be first changed for new ones by, as shown in FIG. 13(II), actuating the upper cylinder 29 (or one cylinder) to advance the screen holding bar 25 thereby exposing the screens 24A and 24B from the changer body 23 while closing the upper divided passage 35 with the bar base portion 25A. At this time, resin melt passes through the lower divided passage 36 (or the other divided passage) and screens 24C and 24D and is fed to the inlet 22A of the mold 22 without any interruption.

In turn, respective set rings 33 of the screens 24A and 24B thus exposed are removed from the corresponding strainers 31, and then only the soiled screen meshes 32 are removed from the strainers 31. Subsequently, new screen meshes 32 are fitted into the respective strainers 31, and the set rings 33 are attached to the strainers 31 to fix the screen meshes 32. Thereafter, the upper screen holding bar 25 is retracted by means of the cylinder 29, so that the condition shown in FIG. 13(III) is assumed.

In turn, as shown in FIG. 13(IV), the lower cylinder 30 (or the other cylinder) is actuated to advance the screen holding bar 26 thereby exposing the screens 24C and 24D from the changer body 23 while closing the lower divided passage 36 with the bar base portion 26A. At this time, resin melt passes through the upper divided passage 35 (or one divided passage) and screens 24A and 24B and is fed to the inlet 22A of the mold 22 without any interruption.

Then, respective set rings 33 of the screens 24C and 24D thus exposed are removed from the corresponding strainers 31, and only the soiled screen meshes 32 are removed from the strainers 31. Subsequently, new screen meshes 32 are fitted into the respective strainers 31, and the set rings 33 are attached to the strainers 31 to fix the screen meshes 32. Thereafter, the lower screen holding bar 26 is retracted by means of the cylinder 30, so that the condition shown in FIG. 13(V) is assumed. Thus, all the screen changing operations are completed.

According to the first embodiment, the screen holding bars 25 and 26 respectively have the pairs of resin passage holes 39 to 42 to which the corresponding screens 24 are attached and, hence, it is possible to significantly increase the filtering area for resin melt and reduce the pressure loss. Moreover, such an arrangement permits the screen meshes 32 themselves to be readily changed without any interruption of the resin melt flow, thereby shortening the time required for screen changing operations and improving the operability. Additionally, since the screen meshes 32 can be changed without the need of removing the strainers 31, the removal and cleaning of the strainers 31 can be dispensed with, resulting in elimination of the time and labor therefor.

Figure 14:
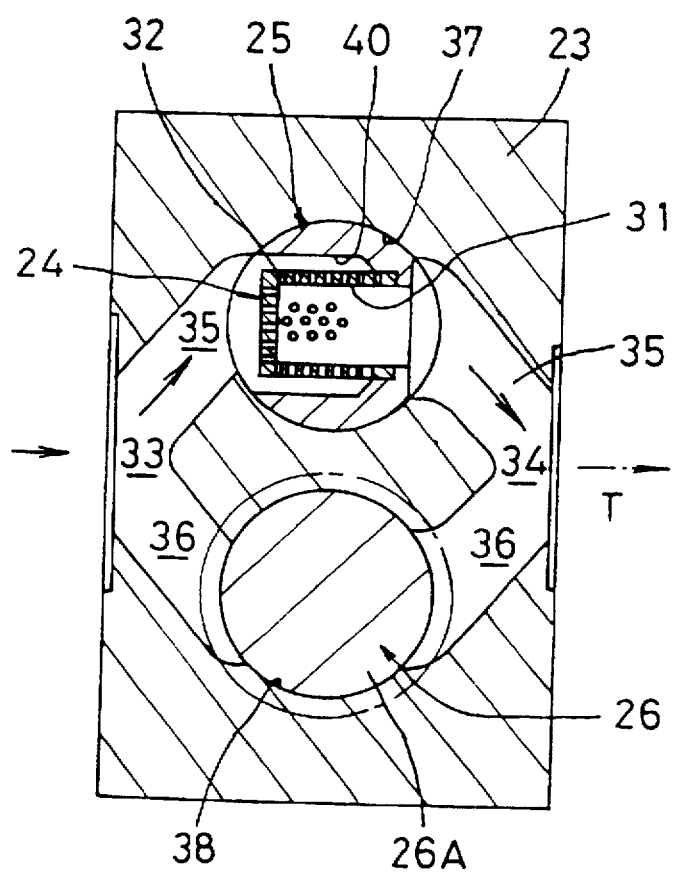
FIG. 14 is a sectional view showing a principal portion of a second embodiment of a screen changer according to the present invention (corresponding to a sectional view taken along line A—A of FIG. 10)

FIG. 14 shows the principal part of the second embodiment of a screen changer according to the present invention. The second embodiment differs from the first embodiment in that screens 24 are disposed in respective passages 39 to 42 as facing opposite the resin melt flow and each fitted over the corresponding strainer 31. The second embodiment requires a change of only the screen meshes 32 in the same manner as the first embodiment and ensures functions and effects comparable to those of the first embodiment. Therefore, like reference characters are given to corresponding parts throughout FIGS. 9 and 14 so as to omit description thereof.

With the above second embodiment, it is required in changing the screen meshes 32 to merely remove resin adhering to the outside of the screen meshes 32, and this provides for improved operability as compared with the first embodiment since the amount of resin to be removed is relatively small.

Figure 15:
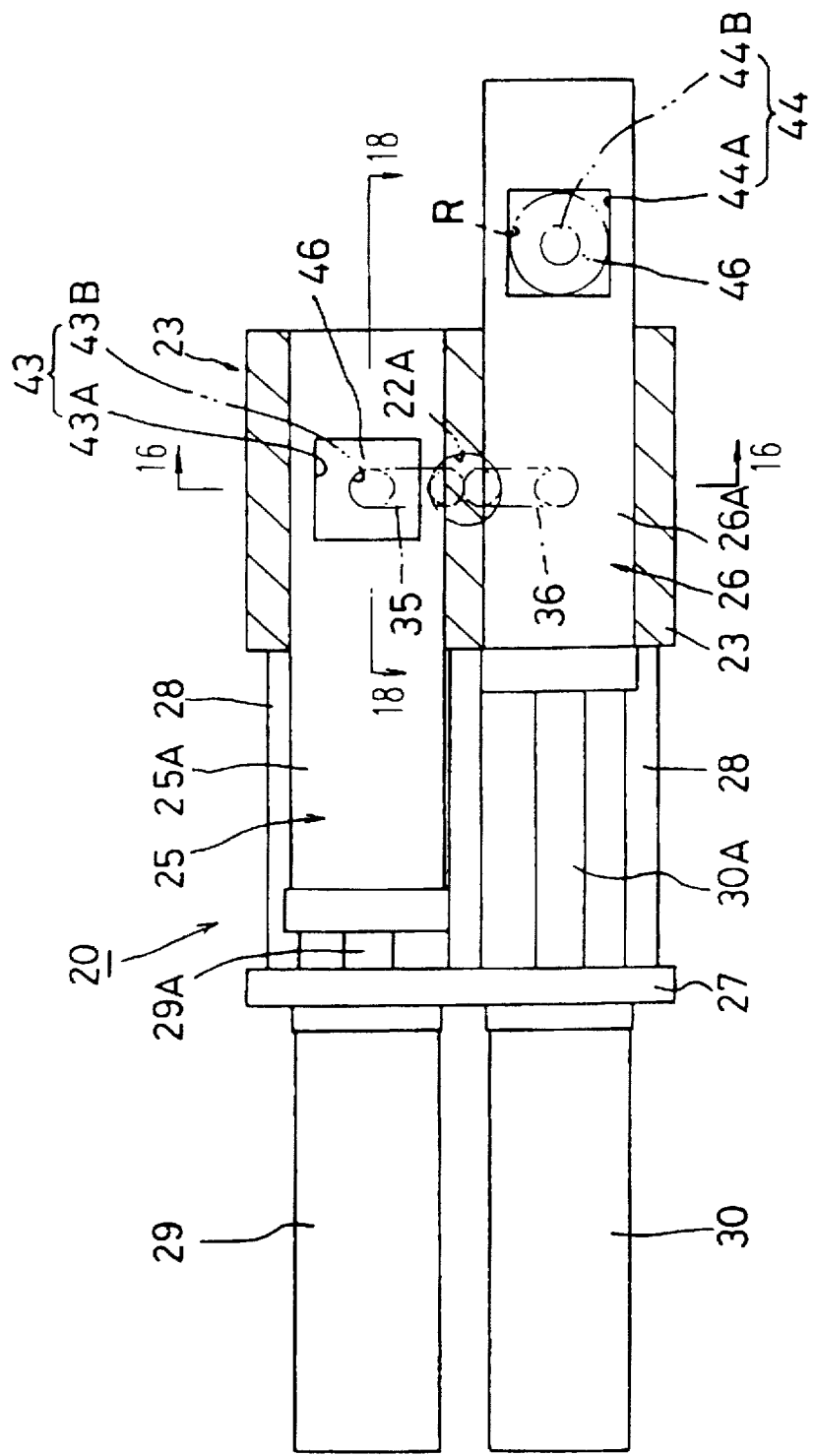
FIG. 15 is a partially cut-away elevational view showing another embodiment of a screen changer according to the present invention.
Figure 16:
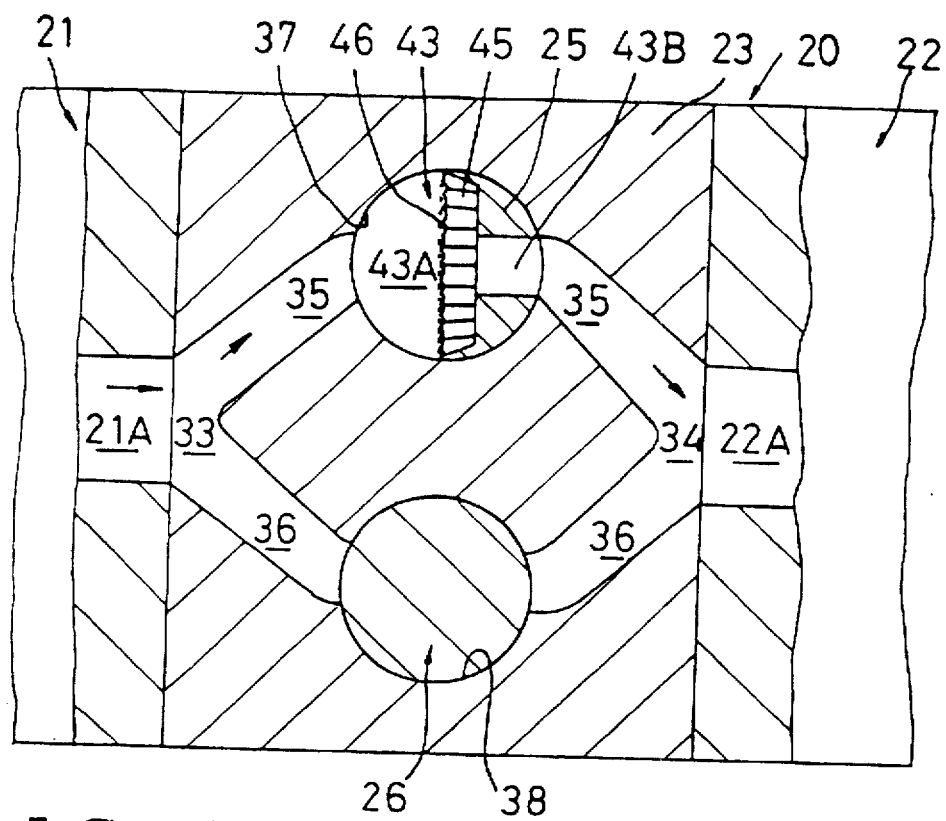
FIG. 16 is an enlarged sectional view taken along line B—B of FIG. 15.

FIGS. 15 and 16 show another embodiment of screen changer 20 according to the present invention. Like the first embodiment, the subject embodiment is disposed intermediate between the resin melt outlet 21A of extruder 21 and the resin melt inlet 22A of mold 22. It should be noted that parts of the screen changer 20 corresponding to those of the first embodiment are denoted by like reference characters throughout FIGS. 9–13 and FIGS. 15 and 16 so as to omit description thereof.

The screen holding bars 25 and 26 of the screen changer 20 have resin melt passage holes 43 and 44, respectively, which are shaped square in section at resin flow-in sides 43A and 44A thereof and circular in section at resin flow-out sides 43B and 44B thereof. The sectional areas of the resin flow-in sides 43A and 44A are made sufficiently larger than those of the resin flow-out sides 43B and 44B.

To each of the resin flow-in sides 43A and 44A of the resin melt passage holes 43 and 44 is detachably attached a square breaker plate 45 having multiple perforations and a sectional area generally equal to the sectional area of each of the resin flow-in sides 43A and 44A. A square screen 46 is changeably disposed upstream of the breaker plate 45. The breaker plate 45 thus shaped square offers a significantly increased resin filtering area while reducing the pressure loss as compared with a circular breaker plate depicted by double-dotted broken line R in FIG. 15, provided that these breaker plates are used in screen holding bars of equal diameter. In addition, this embodiment requires an easy change of only the screen 46 without any interruption of the resin melt flow.

Figure 17:
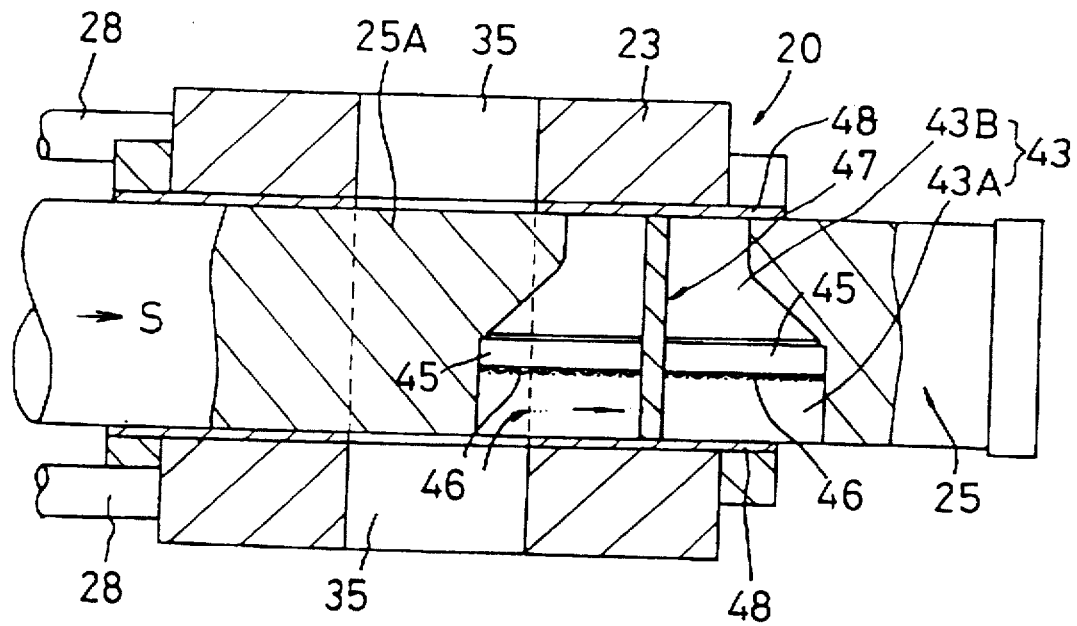
FIG. 17 is a sectional view showing a variation of the above embodiment of a screen changer, corresponding to a sectional view taken along line C—C of FIG. 15.

In the changer 20 of the above embodiment it is possible to shorten the length of seal sleeve 48 provided between the changer body 23 and each of the screen holding bars 25,26 by installing a sealing wall 47 having the same diameter as each of the screen holding bars 25,26 centrally of each breaker plate 45 (in the center of each of the passage holes 43, 44 in terms of the longitudinal direction of the bars 25,26) as shown in FIG. 17.

Figure 18:
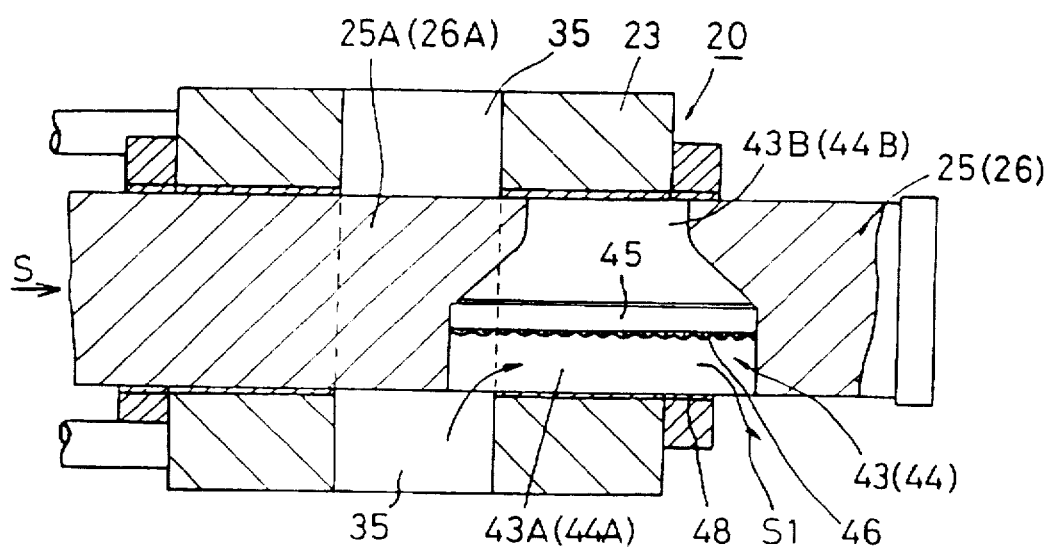
FIG. 18 is a comparative explanatory view of the above variation (corresponding to the sectional view taken along line C—C of FIG. 15)
Figure 19:
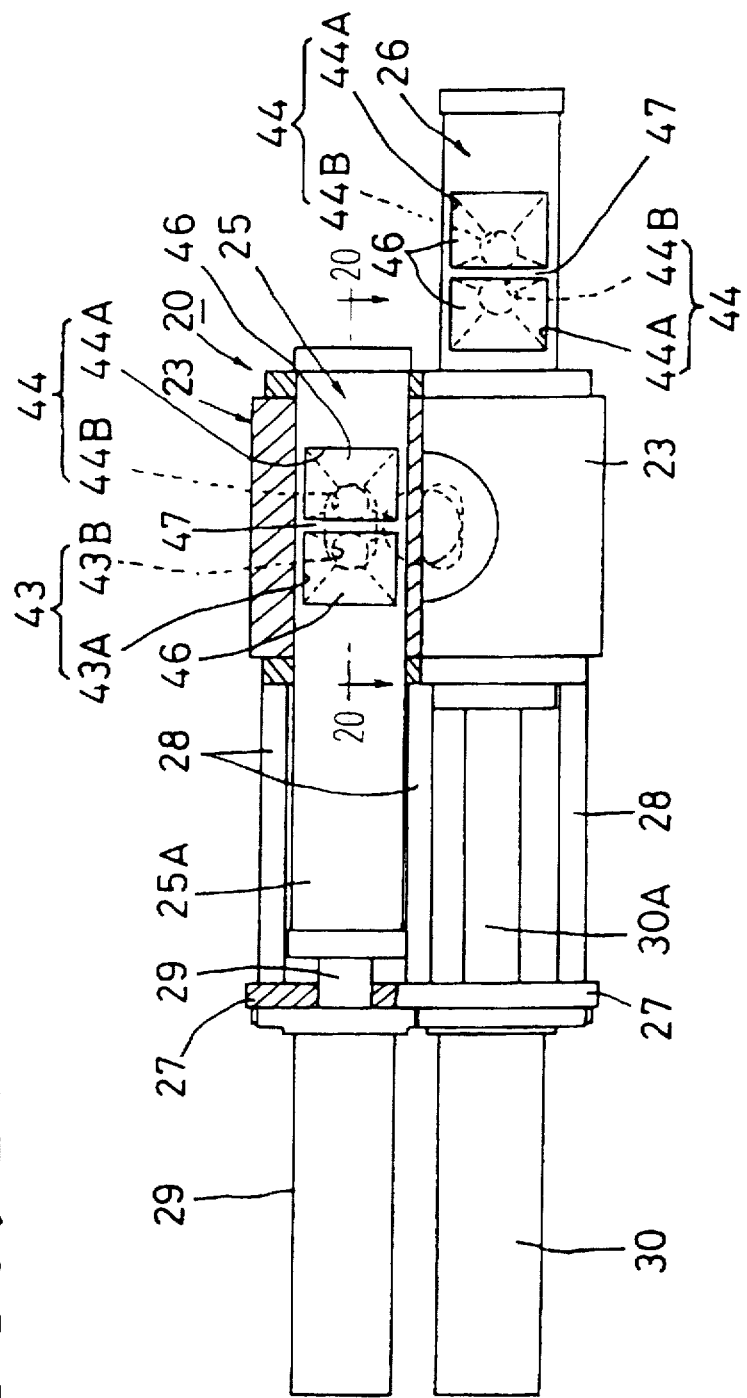
FIG. 19 is a partially cut-away elevational view showing another variation of the above embodiment.
Figure 20:
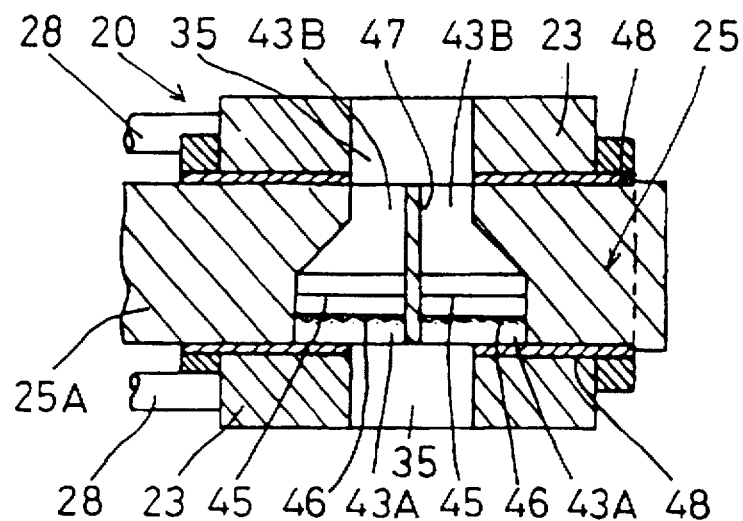
FIG. 20 is a sectional view taken along line D—D of FIG. 19.
Figure 21:
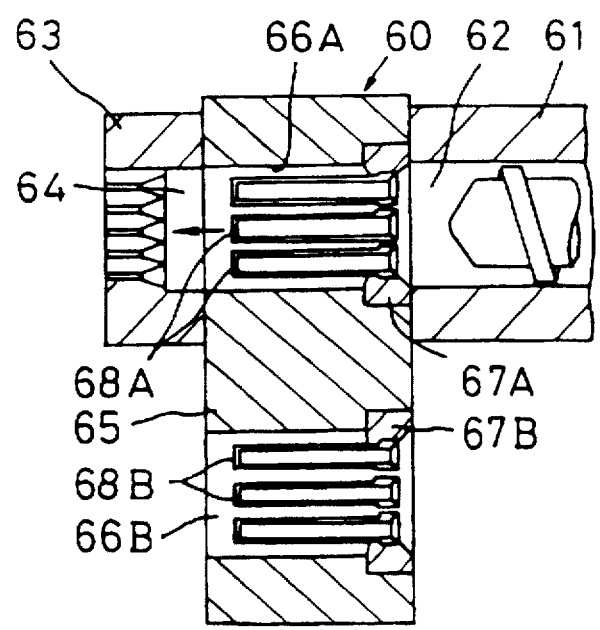
FIG. 21 is a sectional view showing a conventional screen changer 60.
Figure 22:
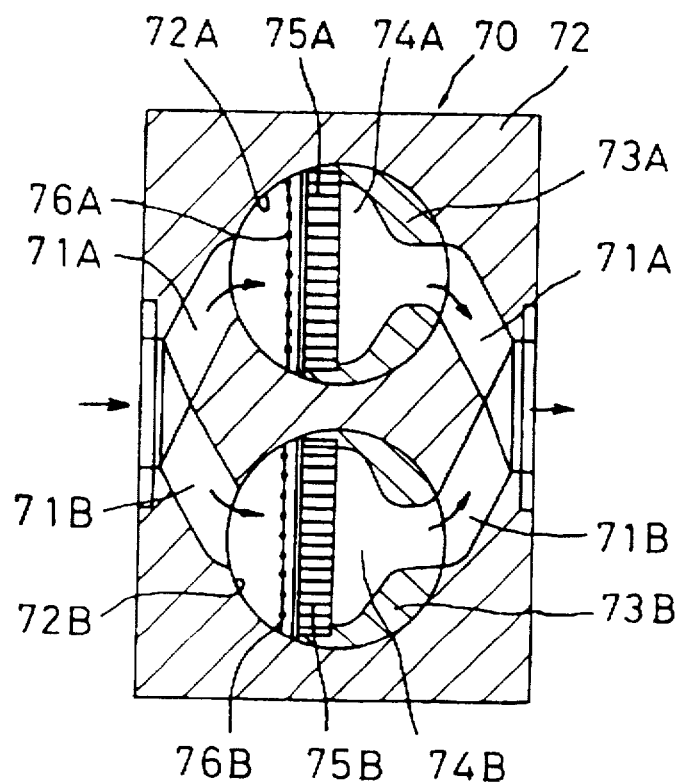
FIG. 22 is a sectional view showing a conventional screen changer 70.

Specifically, if the sealing wall is not provided to the breaker plate 45 as shown in FIG. 18, seal sleeve 48 of a relatively short length causes resin melt to flow out of the passage holes 43,44 to the exterior as indicated by S1 when the screen holding bars 25,26 are slid in the direction indicated by arrow S for screen changing. Hence, seal sleeve 48 is required to be sufficiently long. Where there is provided the sealing wall 47 as shown in FIG. 17, however, even when the resin flow-in side 43A of the passage hole is in communication with the divided passage 35, resin melt is blocked by the sealing wall 47 as soon as the sealing wall 47 leaves the divided passage 35 whereby the resin melt never flows out of the changer body 23.

The procedures of changing the screens 46 in the changer 20 of the subject embodiment are the same as in the first embodiment and, hence, description thereof is omitted.

In the screen changer 20 of the above embodiment it is possible to locate sealing wall 47, which is otherwise provided to the breaker plate 45, in the center of each of the resin passage holes 43,44 of the screen holding bars in such a manner that each resin passage hole is divided into two. Alternatively, such an arrangement is possible that the sealing wall 47 is formed integrally with each of the bars 25,26 and each half of the passage hole thus divided is provided with breaker plate 45 and screen 46 so that only the screen 46 can be changed.

Further, in the changer 20 of the above embodiment the respective resin passage holes 43,44 of the screen holding bars 25,26 may each comprise a pair of resin passage holes. Such a changer can be operated in the same manner as the first embodiment. Furthermore, in the first and second embodiments the screen holding bars 25,26 may each define only one resin passage hole and each have only one screen if the extruder of interest requires only a small filtering area.

The screen changer of the present invention enables an efficient change of the screen for a new one with improved operability and without any interruption of resin melt flow since only the screen mesh is required to be changed. Moreover, the screen changer allows for easy cleaning and enjoys an increased filtering area for resin melt with the pressure loss alleviated.

Further, by shaping square the sectional configuration of at least the resin flow-in side of a resin melt passage hole and attaching square screen and breaker plate to the resin flow-in side of the passage hole, it is possible to ensure a larger filtering area and hence a larger amount of filtration thereby providing for enhanced productivity.

Additionally, the provision of the sealing wall in the breaker plate or the resin passage hole of the screen holding bar makes it possible to shorten the sealing portion needed between the changer body and the screen holding bar thereby to reduce the size of the changer body. This leads to the screen changer having improved working precision and requiring reduced working cost.

INDUSTRIAL APPLICABILITY

The present invention is useful in filtering off impurities in apparatus for extruding resin materials such as kneaders and molding machines and provides for high practicality since a filter member can be assuredly changed when occluded with the impurities.

We claim:

1. A filter member for use in a resin extruder comprising in combination a screen for filtering off impurities contained in a resin material flowing in the extruder and a breaker plate having a multiplicity of resin passageways and attached to the downstream side of the screen for backing up the screen, the resin passageways of the breaker plate are configured into elongated slits extending in a direction intersecting the flow direction of the resin material, wherein the breaker plate comprises a first plate on the upstream side thereof and a second plate on the downstream side thereof which are mated to each other, the slits of one of the first and second plates being larger in width than those of the other plate and extending as intersecting those of the other plate.

2. The filter member as set forth in claim 1, wherein the face of the breaker plate defining the resin passageways is configured circular or rectangular.

3. The filter member as set forth in claim 1, wherein the screen and the breaker plate respectively comprise curved surfaces having a single curvature which protrude in the resin extrusion direction or the direction opposite thereto.

4. The filter member as set forth in claim 2, wherein the screen and the breaker plate respectively comprise curved surfaces having a single curvature which protrude in the resin extrusion direction or the direction opposite thereto.

5. A screen changer for use in a resin molding machine for changing a screen disposed at a resin melt outlet of an extruder to filter off impurities contained in a resin melt, the screen changer comprising: a changer body in which a resin passage is divided into divided passages juxtaposed to each other in the middle of a course of the resin passage from a resin melt inlet to a resin melt outlet and in which a screen holding bar receiving bore is provided extending through the changer body as generally orthogonally intersecting each of the divided passages; a screen holding bar slidably fitted through the bore; a screen changeably mounted in one or two resin melt passage holes located in the screen holding bar for communicating with each of the divided passages and extending as orthogonally intersecting the axis of the bar; and a breaker plate having a multiplicity of through-holes and attached to the resin flow-out side of the screen, wherein each of the resin melt passage holes are configured square in section on the resin flow-in side thereof and circular on the resin flow-out side, and the screen and the breaker plate, which are configured square, are disposed on the resin flow-in side of each of the resin melt passage holes.

6. The screen changer as set forth in claim 5, wherein the breaker plate or each of the resin melt passage holes of the screen holding bar is provided therein with a sealing wall.

* * * * *